United States Patent

[11] 3,581,611

| [72] | Inventor | Rex A. Lentz |
| | | Rochester, Mich. |
| [21] | Appl. No. | 844,870 |
| [22] | Filed | July 25, 1969 |
| [45] | Patented | June 1, 1971 |
| [73] | Assignee | The Babcock & Wilcox Company |
| | | NY, N.Y. |

[54] TAILSTOCKS
8 Claims, 2 Drawing Figs.

[52] U.S. Cl............................................. 82/31,
    82/40, 51/236, 144/209, 142/53
[51] Int. Cl....................................... B23b 23/00
[50] Field of Search........................... 82/31, 40;
    144/209; 51/216, 236, 237; 142/53

[56] References Cited
UNITED STATES PATENTS
2,653,503  9/1953  Cormier........................ 82/31

3,198,226  8/1965  Havmann..................... 144/209
2,576,704  11/1951  Smith........................... 142/53
FOREIGN PATENTS
1,119,629  12/1961  Germany..................... 82/40

Primary Examiner—Leonidas Vlachos
Attorney—Barnes, Kisselle, Raisch & Choate

ABSTRACT: A tailstock comprising a base, a quill, and a work-supporting center rotatably mounted in the quill. First fluid-operated means are provided for moving the quill and the center toward the workpiece and second fluid-operated means are provided for moving the work center independently of the quill so that the work center can be forced toward the workpiece with a greater force in order to initially coin the end of the workpiece and thereafter the second fluid operated means will retain the workpiece in normal work-operating position.

PATENTED JUN 1 1971  3,581,611

INVENTOR
REX A. LENTZ
BY
Barnes, Kisselle, Raisch & Choate
ATTORNEYS it 3,581,611

TAILSTOCKS

BACKGROUND OF THE INVENTION

In production metal turning of repeated identical parts by the use of lathes, it is customary to support the workpiece in a driving assembly, called a headstock, at the drive end of the machine, and in a centering tool, called a live center, in bearings in an assembly, called a tailstock, at the other end of the machine. The headstock at the drive end may employ, among other devices, a chuck, a key, drive pins, or what is called a knife driver to turn the workpiece. In each type, the idea is to engage the workpiece forcibly enough to transmit the drive torque from the headstock to the workpiece. A chuck tends, for instance, to grasp the part on the O.D. (or I.D.) by driving the points of the knurled or serrated jaws into the workpiece. A key or drive pin engages a preformed slot, hole, or the like on the end of the part. A knife driver also engages the end, but in a manner more like a chuck in that the knife blades are rammed axially into the part, displacing or "coining" the drive slots.

It is very desirable to be able to form the drive slots on the lathe. First it avoids a separate operation, and second, it is awkward and time-consuming to have to find the slots when loading a workpiece.

In order to drive the knife home, a force must be applied to the workpiece axially oriented with respect to both workpiece and lathe. One possible method of applying the force is by using the tailstock, which ordinarily has a hydraulic cylinder capable of exerting the necessary force. This presents no problem with regard to the headstock bearings which, in the usual production lathe design, are sufficiently strong and massive to withstand axial forces of this amount indefinitely. However, the tailstock bearings are another matter.

The tailstock cannot be very large in diameter, for the reason that its inertia and other torques opposing rotation cannot be excessive, otherwise the tailstock will not get up to speed without sliding. Specifically, the workpiece is usually engaged by the tailstock center in a very small conical area which is not capable of resisting much frictional torque without inducing sliding between the workpiece and the center. If the rotating live center is too large (and therefore has too great inertia) the center will not turn with the part; instead sliding will occur and the cone point will eventually wear out or burn up. If the angular acceleration is limited to a value low enough to keep the center's inertia torque below the center-to-workpiece friction torque, then the time of the production cycle is increased to an unacceptable extent.

Further, a large live center implies large diameter bearings. Unfortunately, the bearing friction, which adds to the inertia torque in opposing the driving torque goes up very rapidly with diameter. It can reach such a high level that the center never does get up to speed and burning results.

In addition, large bearings mean a large tailstock housing and barrel. In the usual production lathe this means that clearance problems will occur with the rear slide if work is to be done on the workpiece near the tailstock.

Therefore, it is usually very desirable for the tailstock bearings to be small in diameter. Unfortunately, small bearings do not accommodate well to large axial forces. The invariable result is that when an attempt is made to form the drive slots on the lathe, the tailstock bearings wear out very rapidly.

Accordingly, among the objects of the invention are to provide a tailstock wherein the drive slots may be formed on the workpiece when it is on the lathe without adversely affecting the bearings of the tailstock and wherein the forces for forming the drive slots are removed during normal operation of the lathe.

SUMMARY OF THE INVENTION

In accordance with the invention the forces for forming the drive slots are separated from the ordinary forces required to hold the tailstock engaged. Once the drive slots are formed, metal-forming forces are removed since it does not take more than a reasonable amount of axial force applied by the tailstock to hold the workpiece in place, with the knife blades in the headstock spindle engaged with the drive slots. Of course, the live center bearings must be capable of opposing this force plus any axial tool forces during cutting, but the sum of these is always much less than the metal forming force.

DESCRIPTION

Figure 2:
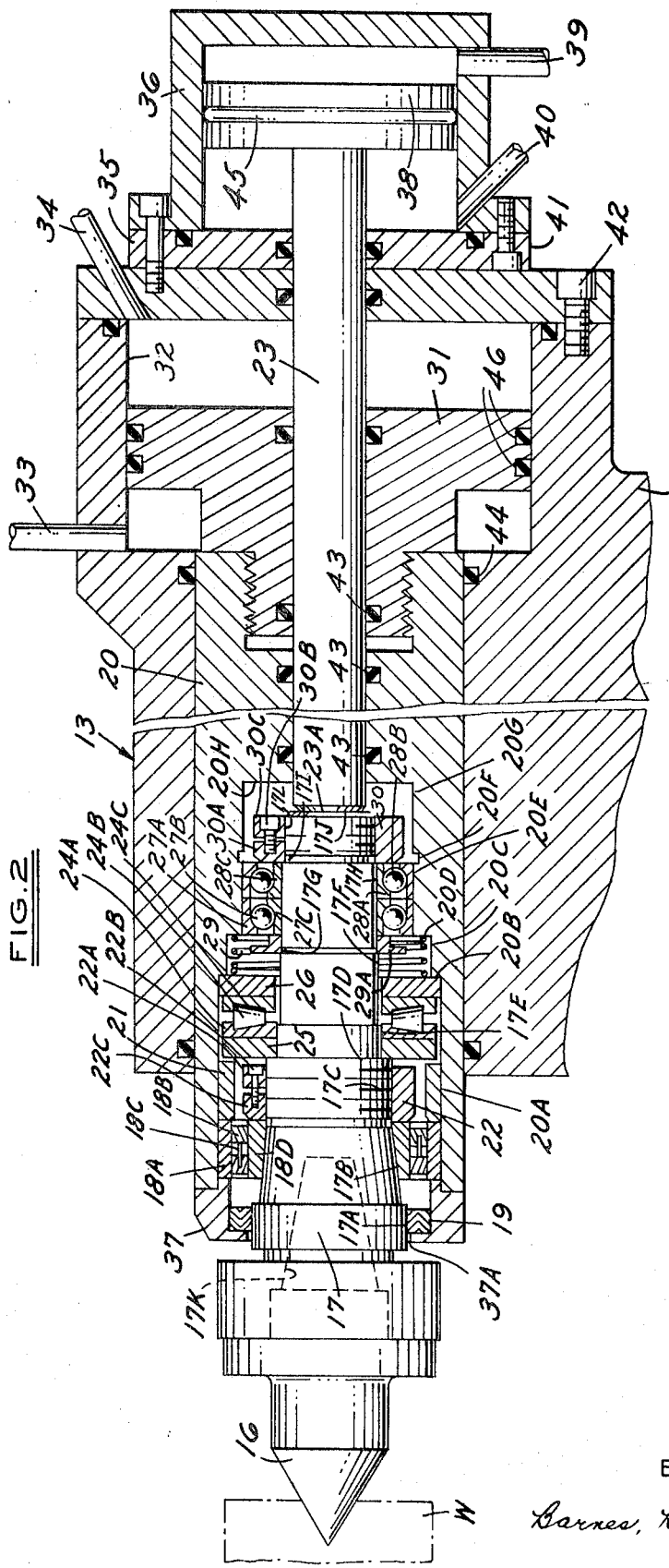
FIG. 2 is a longitudinal sectional view of a tailstock embodying the invention.
Figure 1:
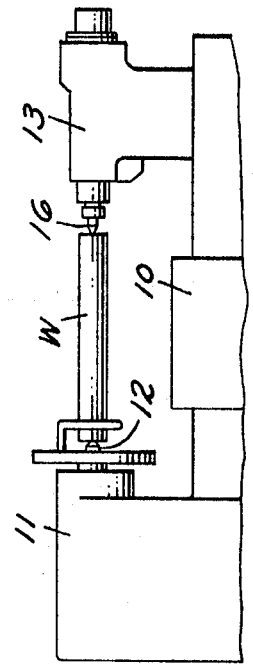
FIG. 1 is a partly diagrammatic side elevational view of a lathe embodying the invention.

Referring to FIG. 1, the lathe embodying the invention comprises a bed 10, a headstock 11 including a knife blade 12, and a tailstock 13. The tailstock assembly 13 comprises a housing 14, a live center assembly 15, a quill 20 and a cylinder 36. A center 16 locks in taper 17K in shaft 17. Center 16 engages the workpiece W. Shaft 17 is supported in quill 20 by bearings 18, 24, 27 and 28, and it, together with the bearings, seals spring 29, retainer 37 and various locking nuts and spacers form a live center assembly 15. A front bearing 18 comprises a twin row cylindrical roller bearing consisting of outer race 18A, rollers 18B, guide 18C and inner race 18D. This bearing is set up to take only radial forces. Retainer 37 is assembled to quill 20 by bolts (not shown). It serves the dual function of holding seal 19 and of restraining outer race 18A against forward motion. Nut 22 is threaded onto male thread 17C of shaft 17 and forces inner race 18D onto the locking taper 17B. Preload on bearing 18 is set by a torque on nut 22. Nut 22 is locked into place by a bolt 22B which joins the two portions of the split section 22A and 22C of nut 22. It will be clear that, if shaft 17 is forced forward, no load will be imposed on bearing 18, since the rollers 18B are free to slide within the limits of the roll spaces in the guide 18C. Sleeve 21 is lightly pressed into quill 20 and serves only as an aid in assembly.

Front thrust collar 25 fits against shoulder 17D and serves as a thrust surface for forward race 24A of thrust bearing 24. Both collar 25 and forward race 24A are assembled on diameter 17E. Rollers 24B provide a bearing rolling between forward race 24A and rear race 24C. Rear race 24C is stationary with respect to the quill 20 and bears on rear collar 26, which rests on shoulder 20B of the quill. Obviously, if the shaft 17 moves to the left (forward) no thrust load is imposed on bearing 24, whereas if 17 attempts to move to the right the bearing 24 will take the load. Rear collar 26 and rear race 24C are fairly loosely inserted in quill 20, being capable of sliding forward to a slight extent. Spring 29 furnishes preload enough so that bearing 24 does not run loosely when the shaft 17 is not under rearward load. Spring 29 is seated in shoulder 20D of the quill.

There is oil in these bearings, of course, for lubrication. In order to insure that it is distributed properly, a slinger 29A is seated in shoulder 17G of the shaft. Bearings 27 and 28 are angular contact bearings, held in place by nut 30 (split as is nut 22 for locking) threaded on section 17L of the shaft. Relief groove 17I is for machining convenience and has no relation to the invention. Nut 30 holds the inner races 27C and 28C firmly in place on diameter 17H of shaft 17. The balls 27B and 28B bear rearwardly and forwardly respectively on outer races 27A and 28A respectively. Thus the bearing assembly 27 and 28 exerts, as a combination, no axial force, the two axial components serving to hold the outer races together as a unit, but exerting no force outside the bearing pair. The outer races 27A and 28A are free to slide axially on diameter 20E of the quill for a short distance. In effect, they take only radial load.

Thus we see that all of the bearings are, as noted below, arranged so that the assembly 15–16–17 with its bearings will oppose and sustain the loads on the shaft directed toward the right, but not those directed toward the left.

The live center assembly 15 is mounted in a barrel or quill 20 which is reciprocated in and out of housing 13 under the force from a cylinder piston 31. The rear of shaft 17 terminates in a hard button 175 which engages shaft 23 of piston 38. Piston 38 operates in cylinder 36 on housing 14.

A piston 31 is fixed on quill 20 and operates in a cylinder 32 in housing 14. Shaft 23 passes through piston 31. Each of cylinders 32, 36 is provided with fluid ports 33, 34 and 39, 40, respectively, through which fluid can be supplied and removed.

In operation, the workpiece is set in place and the tailstock quill 20 is advanced by admitting hydraulic fluid to port 34 advancing piston 31 and quill 20. This carries the live center assembly 15 forward and engages center 16 into the workpiece. Piston 31 and the oil pressure into port 34 are so selected as not to exceed the normal axial load (thrust) rating of bearings 18, 24, 27 and 28.

A very high axial force is then imposed by piston 38 of cylinder 36 by allowing hydraulic fluid under pressure to enter cylinder 36 through port 39. Piston 38 pushes shaft 23 which slides through piston 31 and the rear of quill 20 without transmitting any force to them. Shaft 23, in turn, pushes shaft 17 and center 16 toward the workpiece. However, none of this force reaches bearings 18, 24, 27 or 28, which are (as noted above) so set up as to oppose forces directed to the right, but not to the left. Specifically, as shown the outer races of bearings 27 and 28 are relieved to permit some relative axial movement between the inner and outer races. Of course, the free travel of shaft 17 in these bearings to the left is limited, and piston 38 must not bottom out before full coined depth is reached, or the bearings will be destroyed.

At the completion of knife slot formation, piston 38 is retracted by admitting hydraulic fluid to port 40. The tailstock is held in place because port 34 is still pressurized. The turning operation is now carried out, and the center 16 retracted at completion of the turning by removing pressure from port 34 and pressurizing port 33.

I claim:

1. In a tailstock, the combination comprising
    a base,
    a quill mounted on said base and for at least limited axial movement on said base,
    a center having a workpiece engaging end,
    means for rotatably mounting said center on said quill for at least limited axial movement relative to said quill,
    first fluid-operated means for moving said quill and said center toward a workpiece,
    said second fluid-operated means for moving said center toward the workpiece independently of said quill,
    whereby said center may be moved under full force for coining the end of a workpiece by operation of said second fluid-operated means and may be held in normal position by said first fluid-operated means.

2. The combination set forth in claim 1 wherein said second fluid-operated means comprises a shaft extending generally axially through said quill,
    a cylinder having a piston therein,
    said shaft being operatively connected to said piston.

3. The combination set forth in claim 1 wherein said second fluid-operated means comprises a shaft extending axially of said quill,
    said fluid-operated means acting on said shaft.

4. The combination set forth in claim 1 wherein said means for rotatably mounting said center on said quill comprises at least one bearing having an inner race, an outer race, and bearing means interposed between the inner race and outer race,
    said second fluid-operated means acting upon said center and said inner race.

5. The combination set forth in claim 1 wherein said center has an axially extending portion extending axially of said quill,
    said means for rotatably mounting said center on said quill comprising spaced bearings surrounding said axially extending portion and interposed between said portion and said quill,
    means interposed between said quill and said last-mentioned portion whereby a force from said first fluid-operated means may be applied by said quill independently of the remainder of said portion.

6. The combination set forth in claim 5 wherein
    said first fluid-operated means includes a piston engaging said quill and a cylinder surrounding said piston,
    said second fluid-operated means includes a shaft engaging said axial extending projection at one end and extending axially of the quill through said first-mentioned piston into a second cylinder, and a piston mounted on said shaft in said second cylinder.

7. The combination set forth in claim 1 wherein said center includes an axially extending portion,
    said first fluid-operated means including a piston engaging said quill and a cylinder surrounding said piston,
    said second fluid-operated means including a shaft engaging said axial extending projection at one end and extending axially of the quill through said first-mentioned piston into a second cylinder, and a piston mounted on said shaft in said second cylinder.

8. The combination set forth in claim 7 including hardened elements interposed between the axially extending portion of said center and said shaft.